United States Patent [19]

O'Meara et al.

[11] Patent Number: 5,113,282

[45] Date of Patent: * May 12, 1992

[54] DUAL LIGHT VALVE SYSTEM WITH SELECTIVE DECOUPLING OF LIGHT VALVES

[75] Inventors: Thomas R. O'Meara; David M. Pepper, both of Malibu, Calif.

[73] Assignee: Hughes Aircraft Company, Los Angeles, Calif.

[*] Notice: The portion of the term of this patent subsequent to Sep. 17, 2008 has been disclaimed.

[21] Appl. No.: 75,693

[22] Filed: Jul. 10, 1987

[51] Int. Cl.⁵ ............................. G02F 1/13; G02B 5/23
[52] U.S. Cl. ................................. 359/241; 359/244; 359/47; 359/300
[58] Field of Search .................. 330/4.3; 332/7.51; 350/3.64, 3.68, 352, 354, 330; 250/213 R; 369/106, 110; 372/21; 359/241, 244, 47, 300

[56] References Cited

U.S. PATENT DOCUMENTS

| | | | |
|---|---|---|---|
| 4,013,345 | 3/1977 | Roach | 350/330 |
| 4,019,807 | 4/1977 | Boswell et al. | 250/213 R |
| 4,124,278 | 11/1978 | Grinberg et al. | 350/347 R |
| 4,540,244 | 9/1985 | Sincerbox | 332/7.51 |
| 4,630,898 | 12/1986 | Jewell | 350/385 |
| 4,715,689 | 12/1987 | O'Meara et al. | 332/7.51 |
| 4,725,787 | 2/1988 | Chandra | 330/4.3 |

OTHER PUBLICATIONS

Crosta, G., "Incoherent Feedback Optical System", Opt. & Quant. Elect., vol. 10, #4, Jul. 1978, pp. 361-363.
Garibyan et al., "Optical Phase Conjugation ... Valve", Opt. Commun., vol. 38, #1, Jul. 1, 1981, pp. 67-70.

Primary Examiner—Nelson Moskowitz
Attorney, Agent, or Firm—V. D. Duraiswamy; W. K. Denson-Low

[57] ABSTRACT

Apparatus for selectively limiting the response of an auxiliary liquid crystal light valve which is used in a dual liquid crystal light valve laser optics system for correcting inherent liquid crystal light valve distortion by isolating an atmospheric reference beam from the main laser beam in the auxiliary correction system. Two types of isolation are provided: dual bandwith and dual polarization. In the former, the response bandwidth of the auxiliary liquid crystal light valve is shifted to prevent overlap with the bandwidth of an atmospheric reference wavefront. In the dual polarization form of isolation, provision is made for rotating the polarization of only one of the two interacting beams.

24 Claims, 3 Drawing Sheets

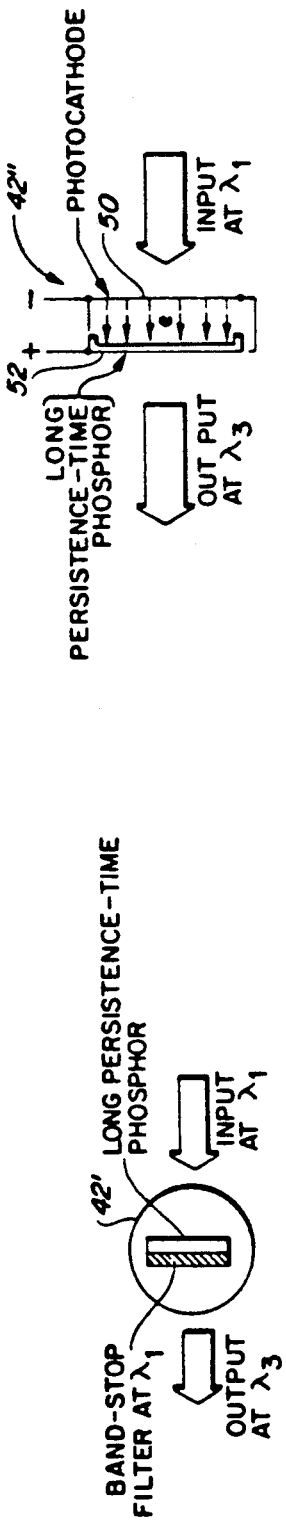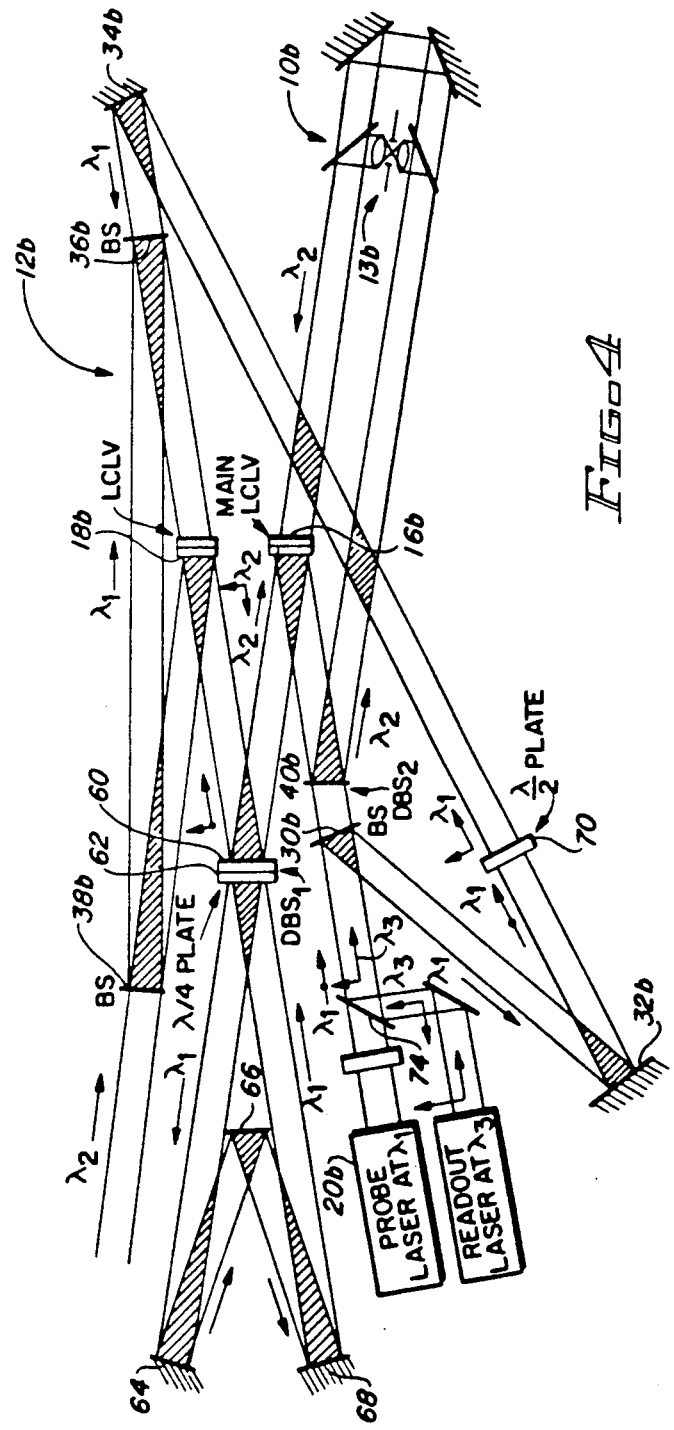

DUAL LIGHT VALVE SYSTEM WITH SELECTIVE DECOUPLING OF LIGHT VALVES

This invention was made with Government support under Contract No. F30602-85-C-0234 awarded by the Department of the Air Force. The Government has certain rights in this invention.

CROSS-REFERENCES TO RELATED APPLICATIONS

The subject matter of this application is related to patent applications Ser. Nos. 865,231, filed May 20, 1986, and 947,575, filed Dec. 24, 1986, now U.S. Pat. No. 5,048,935, now abandoned, both assigned to Hughes Aircraft Company, the assignee of this application.

BACKGROUND OF THE INVENTION

This invention relates to laser beam projection systems utilizing dual light valves to compensate for medium-aberrated waves and to correct for surface defects in a first light valve and, more particularly, to such systems utilizing various arrangements for selectively decoupling interaction between dual light valves.

Since the invention of the laser in the 1960s, a great number of applications have been developed for exploiting the spectral purity and spatial coherence of the laser beam. Communications, data transfer, and the projection and processing of images have come to depend upon the unique properties of the coherent laser wavefront. These properties must be preserved if the powerful and beneficial qualities of laser radiation are to be fully utilized. Except in free space, a laser beam travels through a material medium and the wavefront quality of the laser beam is reduced: high spatial quality waves become aberrated; plane waves emerge with randomly perturbed wavefronts. The diffraction associated with such aberrated waves significantly reduces the ability to focus the beam to a high-quality beamspot or to efficiently transmit a communications signal or image to a remote receiver.

Another problem occurs when such laser wavefronts are transmitting large amounts of energy. Some portion of that energy is absorbed when it passes through a given optics system of lenses, mirrors, and other optical devices, or when it travels through the atmosphere. Typically, when materials absorb energy and heat up, their index of refraction changes. This change in index varies across a given beam profile. The intensity of the beam and the amount of heat absorbed vary as a function of location within the beam. Differences in index cause refraction of a laser beam. The consequent spreading of the high-energy laser beam due to a laser-induced index differential is termed "thermal blooming". Due to thermal blooming, the beam which arrives at its target has spread too far, and even if it is focused, the phase of the beam across its wavefront is so randomized that on the whole it becomes degraded. Thus the laser beam delivers only a small fraction of the energy being transmitted to the receiving site.

In order to counteract these deleterious effects of atmospheric turbulence, thermal blooming, and irregularities within the optical train, adaptive optical systems have been explored and developed. These systems combine wavefront sensing and wavefront correction within a closed feedback loop in order to correct a particular laser beam's wavefront errors. A typical laser beam direction system might work as follows. A laser beam is directed via an atmospheric path to a target or receiving site. Because of turbulence and thermal blooming, only a portion of the radiation reaches the target. In some systems, a laser reference is transmitted back through the atmosphere in order to be used as a probe wave which samples the atmospheric aberrations the light has encountered. In essence, the return signal contains in its wavefront phase the essential information about the composite beam path aberration. If the phase aberrations are then sensed and the laser beam is pre-aberrated to correspond to this phase pattern, during its propagation through the atmosphere, the laser will retrace the path of the target radiation and arrive at the target unaberrated; the full amount of beam energy will then have been transferred.

A variety of apparatus and methods have been developed or proposed for this type of beam correction. These include deformable mirror systems and phase conjugation approaches using nonlinear optical media.

Deformable mirror systems suffer from a great number of inherent problems. The use of discrete, bulky electrical actuators limits the spatial frequency response for the mirror; a deformable mirror simply cannot correct errors finer than the spacing of the push-pull actuator elements. In addition, such actuators typically require several thousand volts for operation and are subject to arc-overs and permanent breakdowns. Their impedance combined with the mass of the mirror surface limits the temporal frequency response of the adaptive system. Each detector/actuator feedback loop requires discrete electronic processing systems and considerable amplification and computation to function properly. Since the thin front surface of the mirror continuously experiences flexures, it suffers from eventual drift and creep problems with consequent loss in performance.

Nonlinear optical media, using degenerate four-wave mixing, stimulated Brillouin or Raman scattering, can provide a time-reversed wave as an output in some applications. While this phase-conjugation method greatly improves the spatial resolution of the system since the "actuator spacing" is now molecular, it also presents certain problems. The input sensitivity is very low, so that a fairly large return signal is necessary in order to set up the proper index grating structure within the phase-conjugation cell. Such power requirements rule out this method for lower-power optical communication and data transfer systems. In addition, with four-wave mixing, coherent pump beams require a considerable amount of energy and must be precisely aligned in angle for the device to function efficiently. The wasted costs of duplicate high-energy lasers for pumping the medium and the resulting low efficiency conversion and transmission of the energy to the target make phase conjugation an interesting but often impracticable means for adaptive optics applications.

An alternative approach to the phase-conjugation method mentioned above involves the use of a liquid crystal light valve incorporating a self-adaptive control system to combine both wavefront sensing and wavefront correction in a single package. Boswell et al in U.S. Pat. No. 4,019,807 disclose one particular version of a standard liquid crystal light valve (LCLV). If the usual liquid crystal element in that disclosed device is replaced with a parallel-aligned tunable birefringent liquid crystal substrate, the modified LCLV device can be used as a deformable mirror. It thus finds particular utility in the wavefront sensing and correction system. A number of benefits flow from the use of such an LCLV in this type of system. The LCLV itself requires no signal processing, electric amplification, or high-voltage sources. It possesses a spatial resolution of approximately 30 microns per pixel, far better than the typical deformable mirror which may have 16 to 60 discrete control areas (or cells) spread over an area of 100 square centimeters.

In such a system, aberrated light from the target, degraded by all the distortions of its travel path, passes through the substituted liquid crystal element, reflects off a dielectric mirror internal to the LCLV, and passes through the liquid crystal element once more. A small fraction of this beam is transferred by various optical means to the back side or photoconductor side of the LCLV where it combines with a locally generated unaberrated, planar, coherent wavefront. This local reference can be realized by spatially filtering part of the feedback beam and, after properly phase shifting it with respect to the initial beam, recombining the beams in the manner indicated in FIG. 1 of the accompanying drawing. The two combined wavefronts create an interference pattern which through careful alignment is in exact registration with the incident target wavefront hitting the front side of the LCLV. A photoconductive layer lies sandwiched behind the liquid crystal element between the dielectric mirror and one clear conductive substrate. Once a voltage is placed across these conductors, any change in resistance in the photoconductor due to absorbed radiant energy engenders a commensurate change in voltage across the liquid crystal element only at that point. The interference pattern impinging on the photoconductive layer provides such a source of radiant energy and the pattern is a representative spatial mapping of the wavefront errors (modulo $2\pi$) of the incoming target radiation. Hence, voltages across the liquid crystal element will change at precisely those points where the phasefront of the target radiation is aberrated. The refractive index and hence optical path length of the liquid crystals will change only at those points corresponding to the applied field variations. Thus, these microscopic phase-shifting elements will retard or advance the local phase of the incoming wavefront until a uniform interference pattern is obtained upon the photoconductive side of the liquid crystal light valve device, at which point the servosystem is in equilibrium.

When the interference pattern is uniform, the incoming wavefront can be completely corrected by the liquid crystal "deformable mirror" if a planar wavefront is reflected off the LCLV. Hence, a pre-aberrated high energy laser beam can be realized so that it can arrive at a given target point substantially unaberrated. Since the LCLV typically requires very little power to produce the desired phase modulation effects, this device can also be used to great advantage in very precise image and data processing systems. Moreover, the rather uniform wavelength dependence of the phase shifts created in the liquid crystal mirror allows multiple wavelength use of the device, just as in conventional deformable mirror technology.

Modified silicon liquid crystal valves (LCLVs) have been selected for use in the system described above for adaptively correcting for atmospheric aberration because of the relatively quick response of the thin silicon device. However, the first generation modified silicon LCLV presents one disadvantage in that it exhibits an inherently high optical non-uniformity. An improved arrangement to compensate for this disadvantage incorporates an additional wavefront correcting LCLV and associated feedback control system to provide correction for the limitations of adaptive optics wavefront correction systems utilizing the thin silicon LCLV.

One of the principal drawbacks of the adaptive optics system using a single or "main" silicon LCLV is that the fast-response, silicon LCLV has a poor surface quality, leading to a reduced output uniformity. The dynamic (phase) range of the device is limited because a relatively thin liquid crystal layer must be used to obtain the fast response. Although the spatial phase-non-uniformity of the silicon LCLV can be corrected by the LCLV valve itself in closed loop operation, this is not a desirable solution because it will use up a significant portion of the already limited dynamic range of the device.

The deficiency of the single LCLV adaptive optics system is compensated for, in the improved arrangement, by the use of a second "corrector" LCLV valve, also operating in a closed-loop configuration, as an adaptive corrector for the main LCLV. The second LCLV has a large dynamic range compared to the main LCLV. Thus it can correct for the main LCLV surface non-uniformities as well as for its own distortions. The LCLV used in the correcting system typically has surface non-uniformities which are much less severe than in the thin silicon LCLV of the main system. This improved arrangement is the subject of application Ser. No. 947,575, now U.S. Pat. No. 5,048,935 mentioned hereinabove. The disclosure of that application is incorporated by reference herein and, further, is here reproduced in part.

In brief, there are two phases in the operation of the aforementioned system. In the first "set mode" phase, the main LCLV feedback loop is disengaged by using an appropriate shutter, and an auxiliary laser is used to drive the wavefront to zero through the auxiliary system coupled to the second LCLV. At the end of the "set mode" period, the wavefront error is driven to zero. At this point, the main operational phase is initiated by activating the main laser, enabling the main feedback loop and disrupting feedback to the compensator LCLV, using appropriate shutters in the second correction loop. Since the corrector LCLV is slow, due to the thick liquid crystal cell which is employed, it will continue to "hold" the modulation information for a certain decay time. Therefore, for the duration of the decay time (which can be up to a number of seconds, whereas the response time of the main laser system is on the order of milliseconds) the main LCLV valve will only have to correct for the atmospheric aberrations, since the corrections for its own aberrations are incorporated in the main wave front. This sequence of "set" and "operation" modes can be repeated with the maximum period being set by the response (decay) time of the corrector LCLV.

This arrangement, by eliminating the necessity of self correction from the main LCLV, allows it to perform correction of the atmospheric aberration faster and with optimal utilization of its limited dynamic range. Dual light valve systems as heretofore disclosed can also be used as general adaptive correctors for high or low spatial frequencies, and for slowly varying errors in existing adaptive optics systems, such as pin cushion errors, optical element variations, thermal distortion of mirrors, and the like.

In the preferred embodiment disclosed in application Ser. No. 947,575, now U.S. Pat. No. 5,048,935 the main LCLV was constructed of silicon, whereas the correcting LCLV was of cadmium sulfide. At the present state of the art, only the silicon type LCLV has the potential for adequate bandwidth for real time atmospheric compensation. The correction LCLV provided a much flatter mirror surface than a silicon device but its speed of response was much too slow, even operating with feedback, for atmospheric compensation.

It has been found that dual light valve systems of the type previously described are faced with a problem of isolation between the respective portions of the system. This may be explained by considering an atmospheric reference beam with an error $\phi_{atm}$ which impinges on the dual light valve system after the correction LCLV has achieved a compensation for the main LCLV. This will cause the main LCLV to compensate for $\phi_{atm}$ by reorienting its liquid crystal molecules. The probe laser beam then sees the index change introduced by the molecular reorientation as well as the optical path difference error introduced by the non-flat mirror of the main LCLV. These errors are transferred to the wavefront error sensor of the correction LCLV and the reorientation of its molecules tends to cancel the combined static error. Unfortunately, the dynamic correction capability is cancelled as well; i.e., the atmospheric compensation potential of the combined dual light valve system is also cancelled. What is needed is some isolation technique whereby the correction LCLV does not see the atmospheric compensation which is introduced by the main LCLV but does see the mirror errors which are introduced by the main LCLV.

SUMMARY OF THE INVENTION

In brief, arrangements in accordance with the present invention provide different isolation techniques in a dual light valve system which eliminate or at least minimize any modification by the correction LCLV of the atmospheric compensation which is introduced by the main LCLV while maintaining the correction of the errors of the mirror surface irregularities of the main LCLV.

Specific arrangements in accordance with the present invention may be classified as two general types: a dual bandwidth system and a dual polarization system. Two embodiments of the latter type are disclosed herein, along with one of the former.

In the dual bandwidth systems in accordance with the invention, elements are introduced in the feedback path associated with the correction LCLV portion of the system so that the response of the correction LCLV is slowed down to the point where it no longer provides any significant correction effect on the atmospheric compensation introduced by the main LCLV, while still effectively correcting the mirror errors of the main LCLV which contain components with frequencies that are within the range of the slowed response of the correction LCLV. In this dual bandwidth decoupling system, the added element to slow down the response of an LCLV may be a long persistence-time phosphor plate backed by a bandstop optical filter. As an alternative, this added element may be a parallel plate (proximity) amplifier with a long persistence-time phosphor which is activated by an internal electron beam.

In the dual polarization systems in accordance with the present invention, a different polarization rotation is introduced into the path of the reference probe beam than is provided for the atmospheric reference wave, thereby permitting the desired isolation to be accomplished by different operations on the two beams. This scheme is possible since the liquid crystal layer only affects one polarization component of the input optical beam; on the other hand, LCLV imperfections and non-uniformities can equally affect or be sampled by a probe beam, regardless of its polarization state.

In one implementation of this dual polarization approach, a dichroic beam splitter is used to separate the probe and atmospheric reference waves, which are at slightly different wavelengths. This separation by the beam splitter permits the insertion of a ¼ wavelength plate into one of the beam paths, e.g., the probe beam path, to develop the desired isolation.

In the second implementation of the dual polarization approach, a non-reciprocal 90° polarization rotation is introduced along the optical path between the two LCLVs, for example by placing a linear 45° rotator in series with a 45° Faraday rotator. In this arrangement, the polarization state of the atmospheric reference wave is unchanged as it propagates through the device, while the probe beam polarization state is rotated by 90° after traversing the optical path, thereby permitting separation of the two beams in order to achieve the desired isolation.

DESCRIPTION OF THE DRAWINGS

A better understanding of the present invention may be realized from a consideration of the following detailed description, taken in conjunction with the accompanying drawings in which:

FIGS. 3a and 3b show schematic representations of two different devices which may be used to achieve the desired operation of the system of FIG. 2;

FIG. 4 is a schematic representation of one particular arrangement for developing dual polarization to achieve the desired isolation between the two compensating portions of the system of FIG. 1.

DESCRIPTION OF THE PREFERRED EMBODIMENTS

Figure 1:
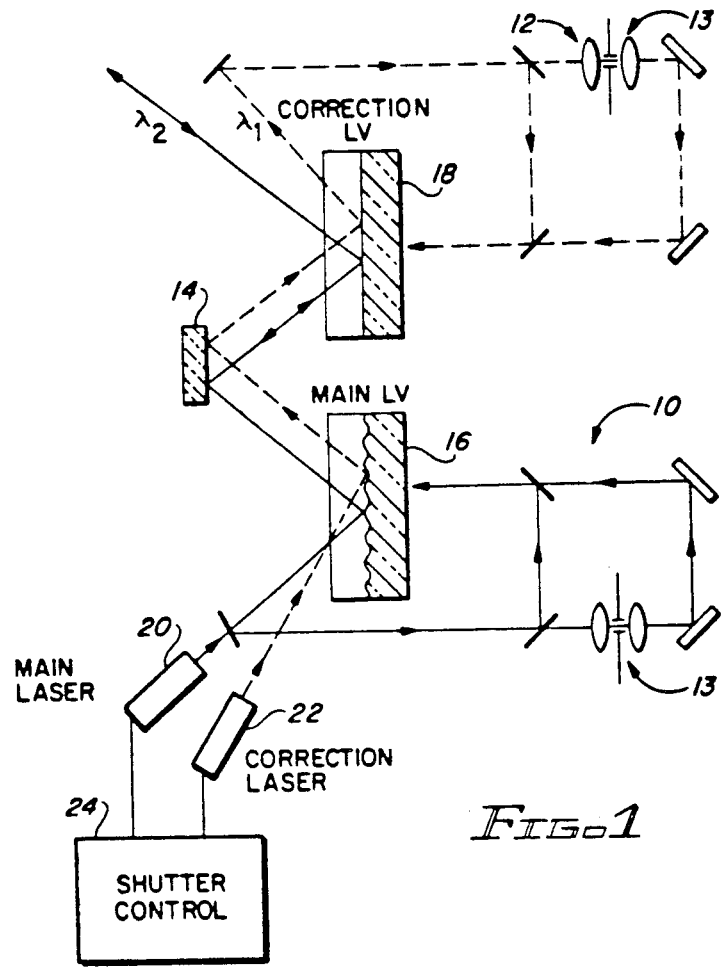
FIG. 1 is a schematic view of a dual light valve system such as that which is disclosed in the aforementioned application Ser. No. 947,575.

FIG. 1 is a schematic diagram illustrating a dual LCLV system for correcting for the phase non-uniformity of the main LCLV which is provided for compensating for aberrations introduced in the atmospheric wave, as disclosed in application Ser. No. 947,575, now U.S. Pat. No. 5,048,935. Briefly, the overall system of FIG. 1 comprises a main system 10 operated in conjunction with a correction system 12 intercoupled via a mirror 14. The difference between the two systems 10, 12 of FIG. 1 resides in the particular LCLV which is incorporated therein. The system 10 includes as the main light valve a fast response silicon LCLV 16. Because a relatively thin liquid crystal layer must be used to achieve the fast response, the device 16 has a poor quality of reflective surface and exhibits significant spatial phase-non-uniformity. The correction system 12, on the other hand, includes an LCLV 18, which may be a cadmium sulfide light valve. Its liquid crystal layer is substantially thicker than the liquid crystal layer of the main LCLV 16, thus exhibiting a significantly slower response. Because of its thicker construction and the material which is utilized, LCLV 18 exhibits substantial spatial phase uniformity. Each of the two systems 10, 12 includes a pin hole aperture and lens arrangement 13 to generate an unaberrated, planar local reference beam.

The system of FIG. 1 includes a main laser 20 for generating the primary laser beam referenced to the wavefront $\lambda_2$ and an auxiliary or correction laser 22 for generating the laser beam referencing the wavefront $\lambda_1$ that is used in the correction mode. A shutter control stage 24 is shown coupled to the two lasers 20, 22 to control alternate generation of the two laser beams. Alternatively, the electrical drive supplies to either of the two LCLVs can be gated on or off.

In the operation of the system of FIG. 1 to develop the compensation or correction for the surface irregularities of the main LCLV 16, the feedback loop in the main system 10 is disengaged by disabling the main laser 20. During this interval, the correction laser 22 is used to drive the wavefront $\lambda_1$ to zero. It will be seen that this wavefront corresponds to the spatial phase aberrations which are introduced by the main LCLV 16. The upper feedback loop of system 12 operates to achieve this compensation. At the end of the correction or "set mode" interval, the wavefront $\lambda_1$ will have been driven to zero. At this point, the control stage 24 is controlled to initiate the main operational phase in which the main laser 20 is activated while the correction laser 22 is disabled. During the main operational phase when the main laser 20 is active, the feedback loop of the main system 10 is enabled to provide the atmospheric aberration correction of the wavefront $\lambda_2$ in the manner previously described.

As described in application Ser. No. 947,575, now U.S. Pat. No. 5,048,935, the relatively slower response time of the LCLV 88 enables the correction system 82 to continue to hold the modulation information which was developed during the set mode phase for a certain decay time period. This decay time can extend for a second or more and, for its duration, the main LCLV 16 will only have to correct for atmospheric aberrations, as the corrections of its own spatial phase aberrations are incorporated in the emerging wavefront $\lambda_2$. A sequence of set and operation modes can be repeated with the maximum period set by the response (decay) time of the correction LCLV 18.

Figure 2:
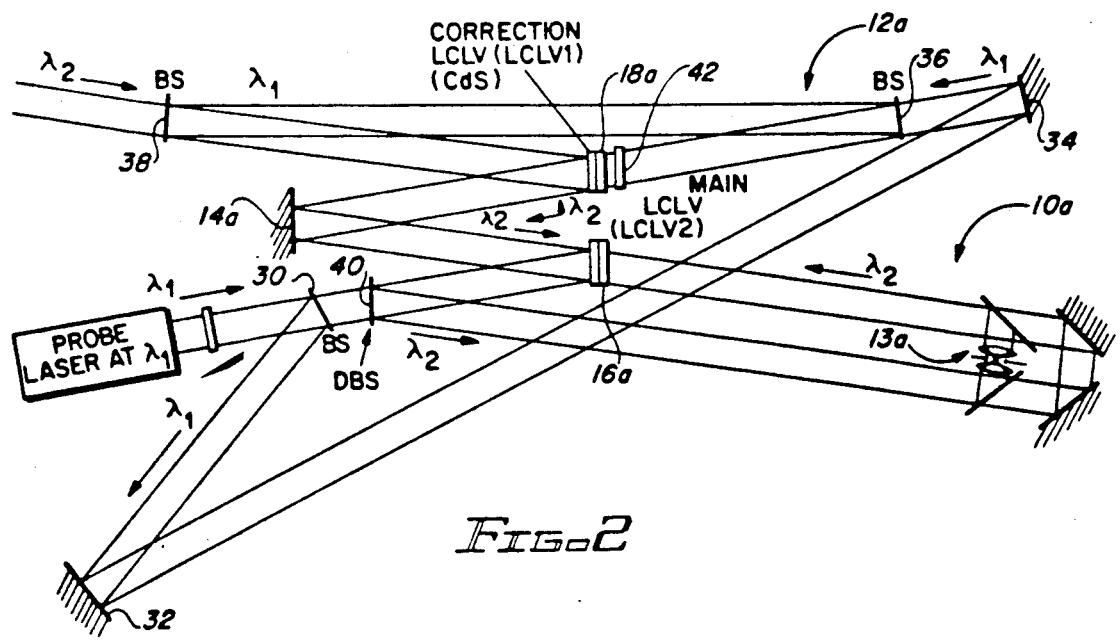
FIG. 2 is a dual bandwidth system in accordance with the present invention for achieving isolation between the two compensating portions of a system such as that which is shown in FIG. 1.

While the response of the cadmium sulfide correction LCLV 18 is slower than that of the main LCLV 16, there is still not enough difference in the response times of these two devices to achieve the desired bandwidth separation. FIG. 2 illustrates schematically a dual bandwidth system which incorporates the added elements which develop the capability of achieving the desired dual bandwidth separation.

In the arrangement of the dual bandwidth system in accordance with the present invention which is depicted schematically in FIG. 2, the beam from a single probe laser is divided, directed over different paths, and then recombined to achieve compensation at the correction LCLV. In FIG. 2, those elements which correspond to elements shown in FIG. 1 are designated by like reference numerals, followed by the suffix "a".

In addition to elements corresponding to those designated in FIG. 1, the system of FIG. 2 includes a beam splitter 30 which directs a portion of the primary beam from the probe laser 20a to a mirror 32 which reflects the beam impinging upon it to another mirror 34 which again reflects this beam to a beam splitter 36 where it is combined with that portion of the probe beam that has been directed along the path shown in FIG. 1, via the main LCLV 16a, the mirror 14a, the correction LCLV 18a, and a further beam splitter 38. These two portions of the probe beam, after recombination at the beam splitter 36, are directed to the backside of the correction LCLV 18a. The main compensation system portion 10a and the correction system portion 12a operate as described in connection with FIG. 1. As in FIG. 1, the main compensation system portion 10a is coupled to the path of the probe beam $\lambda_1$ and the atmospheric wavefront $\lambda_2$ by way of a diochroic beam splitter 40. Additional lenses and other optical elements are included in the system portion 10a, corresponding generally to those shown in FIG. 1.

As described thus far, the arrangement depicted in FIG. 2 is equivalent to that of FIG. 1 in operation, whereby the correction LCLV 18a serves to compensate for the mirror errors introduced in the wavefronts $\lambda_1$ and $\lambda_2$ due to surface irregularities in the main LCLV 16a. In the operation of the system of FIG. 2, the probe beam $\lambda_1$ impinges on the main LCLV 16a which is operating at the maximum bandwidth of which it is capable. After reflection from main LCLV 16a, the probe beam acquires two wavefront variational components: (1) an atmospheric component which may typically contain frequencies ranging from a few Hz to several KHz; and (2) a mirror error component with frequencies which typically fall well below 0.01 Hz. A temporal averaging device 42 is installed directly behind the correction LCLV 18a in the path of the beam for the correction system portion 12a. This device 42 serves as a slow down element in the feedback path of the system portion 12a and effectively limits the response of the correction LCLV 18a and its associated compensating system portion to be compatible with those error component frequencies which are generated by the main LCLV 16a in the 0.01 Hz range. With the resultant shift to the lower frequency range of the response bandwidth of the correction LCLV 18a and system portion 12a, the correction system portion is no longer responsive to the atmospheric component frequencies which are two to five decades above the mirror error component frequencies.

FIGS. 3a and 3b show two alternative devices which may be utilized for the temporal averaging device 42' of FIG. 2. The device of FIG. 3a is a passive temporal averaging device which is realized by a long persistence-time optically excited phosphor joined to a band-stop filter having a stopband at the wavelength $\lambda_1$. In the operation of this device in the circuit of FIG. 2, the input wave impinging on the right-hand side of the device 42 at the wavelength $\lambda_1$ is converted to provide a non-coherent output at $\lambda_3$, minus the $\lambda_1$ wavelength which is blocked by the filter. This is then passed to the backside of the correction LCLV 18a to achieve the correction function as described, without compensating modification of the atmospheric waveform components.

FIG. 3b depicts an active temporal averaging device 42" which includes a cathode and anode coupled to an external voltage source to achieve a similar result. A photocathode 50 receives the input beam at $\lambda_1$ and correspondingly emits electrons which are directed at an anode 52 having a long persistence-time phosphor. The output of this anode is the non-coherent wave $\lambda_3$ which is then directed to the correction LCLV 18a to achieve compensation therein without affecting the atmospheric component frequencies.

FIG. 4 is a schematic representation of a system for achieving beam isolation by resort to dual polarization. The system of FIG. 4 is similar to that of FIG. 2 except that it does not include a temporal averaging device 42 and instead it provides a quarterwave plate and associated dichroic beam splitter to direct the probe laser beam over an additional path including a plurality of mirrors to develop the desired beam direction. In FIG. 4, like reference numerals for elements corresponding to those appearing in FIG. 2 are used to designate those elements with the addition of the suffix "b". Thus, the beam $\lambda_1$ from probe laser 20b is shown being divided by a beam splitter 30b with the reflected beam portion being directed at a mirror 32b, to a second mirror 34b and thence toward the correction LCLV 18b. The main portion of wave $\lambda_1$ passes through the beam splitter 30b, a dichroic beam splitter 40b where it divides in the manner described in connection with FIG. 2 to develop the atmospheric correction which is accomplished by the main LCLV 16b and the main system portion 10b associated therewith. A portion of the $\lambda_1$ beam ultimately reaches the correction LCLV 18b and is reflected over the path including the beam splitters 38b and 36b, at the latter of which it recombines with the portion reflected by the mirror 34b in the correction system portion 12b.

It will be noted that the mirror 14a of FIG. 2 is absent from FIG. 4. Instead, at approximately the same location, there is installed a dichroic beam splitter 60 in front of a quarterwave plate 62. Behind the plate 62 are mirrors 64, 66, 68 which direct the $\lambda_1$ wave over a path which returns through the quarterwave plate 62 and dichroic beam splitter 60 and is directed at the correction LCLV 18b. It will also be noted that a halfwave plate 70 is mounted in the path of the $\lambda_1$ beam between mirrors 32b and 34b. In addition, a readout laser 72 operating to provide a $\lambda_3$ response is coupled into the beam path in front of the probe laser 20b by means of a half mirror 74.

In the operation of the system depicted in FIG. 4, the probe beam impinges on the main LCLV 16b with a polarization which is normal to the usual direction; i.e., it is normal to the plane of incidence and to the LC molecule. Thus, it sees no spatially varying phase shifts which may be introduced by the LC molecular reorientation. However, it does acquire a phase shift which is representative of the underlying mirror distortions. If the probe beam were to impinge on the correction LCLV 18b with this same polarization orientation, then this system could not operate closed loop because the amount of correction error could not be sensed by the associated wavefront error sensing interferometer. To avoid this difficulty, the polarization is rotated by 90° in the system of FIG. 4, thereby permitting the correction LCLV to operate closed loop.

On the other hand, if the atmospheric reference wave $\lambda_2$ (which follows nearly the same path as the probe wave $\lambda_1$) were also rotated in polarization, it would not see the combined corrective compensation of both LCL layers in both devices 16b and 18b. In order to achieve a polarization rotation in one direction for the probe beam $\lambda_1$ and not in the other direction (for the atmospheric reference wave $\lambda_2$), different degrees of polarization rotation are introduced in the different beam paths.

In the system illustrated in FIG. 4, separate paths have been introduced for the two directions of the beams $\lambda_1$ and $\lambda_2$. For example, if the probe beam $\lambda_1$ is at a slightly different wavelength from the atmospheric reference $\lambda_2$, as indicated, then the two paths may be separated by a dichroic beam splitter, such as the dichroic beam splitter 60, which thereby permits the insertion of the quarterwave plate 62 in only one of the beam paths—in this case, the path of the probe beam $\lambda_1$ where it traverses the mirrors 64, 66 and 68. The readout laser 72, operating at wavelength $\lambda_3$, is used to read out the conjugate wavefront. The laser 72 may be either pulsed or continuous wave, as desired.

Figure 5:
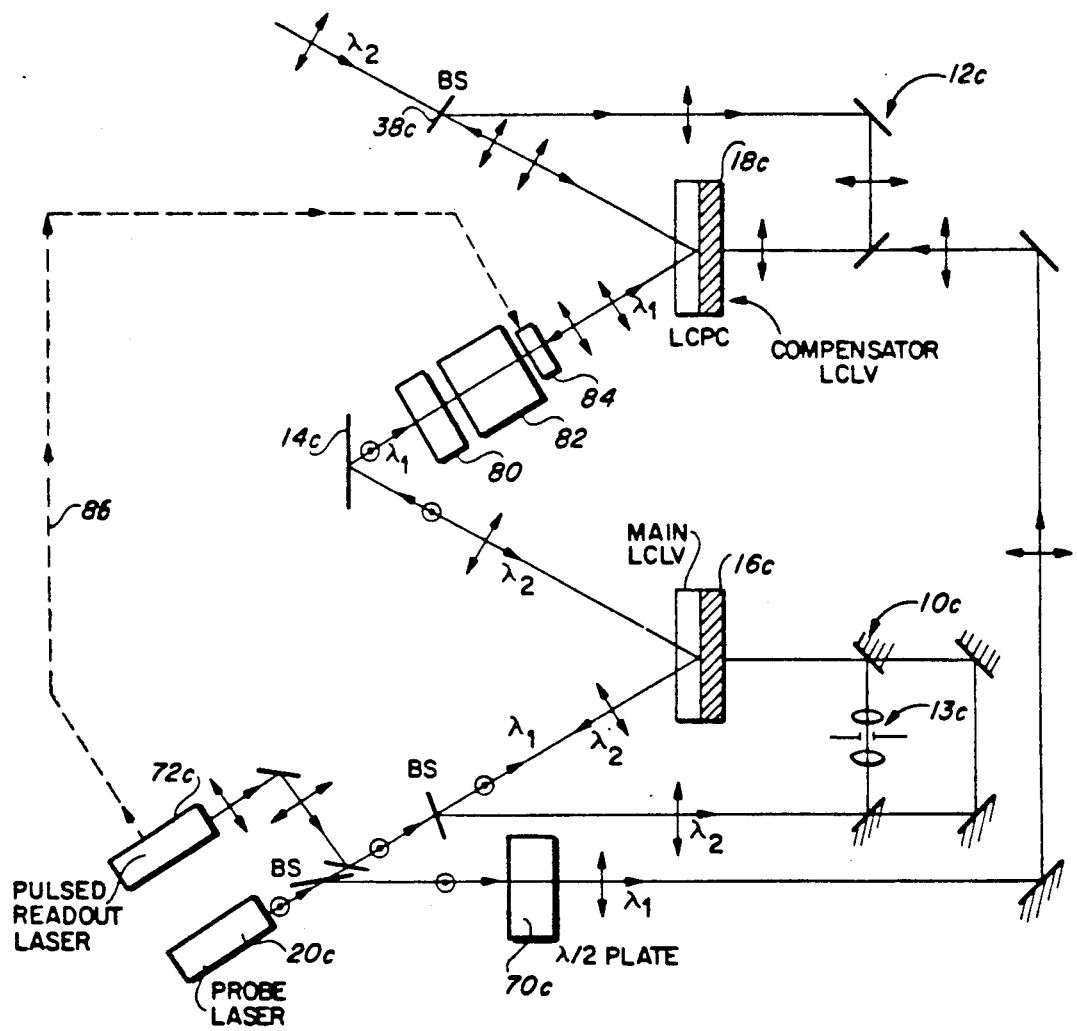
FIG. 5 is an alternative arrangement to that depicted in FIG. 4 for achieving isolation by dual polarization of the two compensating system portions of FIG. 1.

An alternative implementation of a dual polarization system is represented schematically in FIG. 5, wherein elements corresponding to those in FIG. 4 are designated by like reference numerals, followed by the suffix "c". The principal difference between the systems of FIGS. 4 and 5 is the inclusion of non-reciprocal 90° polarization along the optical path between the two LCLVs 16c, 18c. As shown in FIG. 5, this non-reciprocal polarization rotation is achieved by means of a conventional (linear) 45° rotator 80 in series with a 45° Faraday rotator 82 adjacent the mirror 14c. In this manner, the polarization state of the atmospheric reference $\lambda_2$ is unchanged as it propagates through the device. However, the probe beam polarization state $\lambda_1$ is rotated by 90° after traversing the rotators 80, 82. For readout, the conjugate readout wave $\lambda_3$ is generated by a pulsed readout laser 72c which is co-linear to the probe laser 20c and orthogonally polarized to it. A 90° E-O plate 84 is simultaneously pulsed into operation in synchronism with the pulsed readout laser 72c, as indicated by the dashed line 86.

By resort to either of the techniques of FIGS. 4 and 5, one may achieve the desired selective isolation through dual polarization of the chosen system, thereby simultaneously achieving both atmospheric compensation and device compensation without undue interaction between the two.

Although there have been described above specific arrangements of a dual light valve system with selective decoupling of light valves in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for preventing undesired correction of an atmospheric reference wavefront in a dual light valve, laser wavefront correcting system comprising:

a main aberration correction system having a first liquid crystal light valve operatively coupled to a feedback portion for causing the liquid crystal light valve to adjust its reflective properties in a manner to drive to zero the atmospheric aberrations in a reference wavefront impinging thereon;

an auxiliary correction system having a second liquid crystal light valve operatively coupled to a second feedback portion for causing the second liquid crystal light valve to adjust its reflective properties in a manner to store a phase correction pattern derived from the first liquid crystal light valve;

a main laser coupled to direct a beam to the first liquid crystal light valve and to the feedback system associated therewith for controlling the first liquid crystal light valve to correct the wavefront of an atmospheric reference beam by driving the phase errors in said wavefront to zero;

means for directing said beam to the first liquid crystal light valve and thereafter by reflection to the second liquid crystal light valve and to the feedback portion of the auxiliary correction system for writing the phase correction pattern corresponding to the first liquid crystal light valve on the second liquid crystal light valve; and means for selectively decoupling the auxiliary correction system from the main aberration system to prevent the auxiliary correction system from modifying the atmospheric aberration correction performed by the main aberration correction system.

2. The apparatus of claim 1 wherein the selectively decoupling means comprise means for separating the bandwidth of the auxiliary correction system from the bandwidth of the main aberration correction system.

3. The apparatus of claim 2 wherein said last-mentioned means include an added element installed in the second feedback portion which is coupled to the second liquid crystal light valve of the auxiliary correction system to slow the response of said second liquid crystal light valve below the range of correction of the atmospheric compensation developed by the first liquid light valve.

4. The apparatus of claim 3 wherein said added element comprises a temporal averaging device installed adjacent the second liquid crystal light valve in the path of the beam which is directed toward said second liquid crystal light valve to adjust the reflective properties thereof.

5. The apparatus of claim 4 wherein said temporal averaging device is a passive device.

6. The apparatus of claim 5 wherein the passive temporal averaging device comprises a long persistence, optically excited phosphor joined to a band-stop filter.

7. The apparatus of claim 6 wherein the stop band of said band-stop filter corresponds to the wavelength of the main laser beam.

8. The apparatus of claim 7 wherein the temporal averaging device converts said beam which is directed to the second liquid crystal light valve to a non-coherent output at a different wavelength which is devoid of beam energy at the wavelength of the main laser.

9. The apparatus of claim 4 wherein the temporal averaging device is an active device.

10. The apparatus of claim 9 wherein the temporal averaging device comprises a photocathode for emitting electrons in a pattern corresponding to an input beam at the wavelength of the main laser, and an anode positioned to receive said electrons.

11. The apparatus of claim 10 wherein said anode has a long persistence phosphor for developing, in response to said electrons, a non-coherent output at a different wavelength which is devoid of beam energy at the wavelength of the main laser.

12. The apparatus of claim 1 wherein the selectively decoupling means, comprise means for introducing a different polarization rotation for the main laser beam from that which exists for the atmospheric reference wavefront.

13. The apparatus of claim 12 including a dichroic beam splitter positioned to separate the atmospheric reference wavefront from the main laser beam, and further including a quarterwave plate inserted in the path of only one of said main laser beam and said atmospheric reference wavefront.

14. The apparatus of claim 13 wherein the quarterwave plate is inserted in the path of the main laser beam.

15. The apparatus of claim 12 wherein said selectively decoupling means comprise means for introducing a non-reciprocal 90° polarization rotation in the optical path between the first and second liquid crystal light valves.

16. The apparatus of claim 15 wherein said means for introducing rotation in said optical path comprise a linear 45° rotator in series with a 45° Faraday rotator and further including a pulsed readout laser coupled to the return path of the atmospheric reference wavefront for generating a conjugate readout having a wavelength which is different from the wavelength of said main laser, said readout laser being co-linear to the main laser and orthogonally polarized with respect to it.

17. The apparatus of claim 16 further including a 90° E-O plate mounted in series with said rotators, and means for simultaneously pulsing the E-O plate into operation in synchronism with the pulsed readout laser.

18. The apparatus of claim 1 wherein the first liquid crystal light valve is a silicon liquid crystal light valve.

19. The apparatus of claim 2 wherein the second liquid crystal light valve is a cadmium sulfide liquid crystal light valve.

20. The method of selectively decoupling a dual light valve, laser wavefront correcting system, which system comprises a main aberration correction system having a first liquid crystal light valve operatively coupled to a feedback portion for causing the liquid crystal light valve to adjust its reflective properties in a manner to drive to zero the atmospheric aberrations in a reference wavefront impinging thereon and an auxiliary correction system having a second liquid crystal light valve operatively coupled to a second feedback portion for causing the second liquid crystal light valve to adjust its reflective properties in a manner to store a phase correction pattern derived from the first liquid crystal light valve, the method comprising the steps of:

directing a beam to the first liquid crystal light valve and to the feedback system associated therewith for controlling the first liquid crystal light valve to correct the wavefront of an atmospheric reference beam by driving the phase errors in said wavefront to zero;

directing said beam to the first liquid crystal light valve and thereafter by reflection to the second liquid crystal light valve and to the feedback portion of the auxiliary correction system for writing the phase correction pattern corresponding to the first liquid crystal light valve on the second liquid crystal light valve; and isolating the second feedback portion coupled to the second liquid crystal light valve in the auxiliary correction system from the atmospheric reference wavefront path to preclude any compensation for said atmospheric aberrations by the auxiliary correction system.

21. The method of claim 20 wherein the step of isolating the second feedback portion comprises shifting the response bandwidth of the liquid crystal light valve in the auxiliary correction system outside the response bandwidth of the liquid crystal light valve in the main aberration correction system.

22. The method of claim 21 wherein the step of shifting response bandwidth comprises shifting the response bandwidth of the liquid crystal light valve in the auxiliary correction system to a wavelength range which is lower than and non-overlapping with the response bandwidth range of the liquid crystal light valve in the main aberration correction system.

23. The method of claim 22 wherein the step of shifting response bandwidth further comprises inserting an added element into the path of the beam which is directed to the second liquid crystal light valve in order to convert the beam energy to a non-coherent wave which is devoid of wavelengths corresponding to the beam which is directed to the first liquid crystal light valve.

24. The method of claim 20 wherein the step of isolating the second feedback portion comprises selectively rotating only one of the beam which is directed to the first liquid crystal light valve and the atmospheric reference beam.

* * * * *